United States Patent

[11] 3,555,954

| [72] | Inventors | Burton L. Payne<br>Webster;<br>Ward K. Darron, Rush; Peter M. Zuris,<br>Rochester, N.Y. |
|---|---|---|
| [21] | Appl. No. | 755,340 |
| [22] | Filed | Aug. 26, 1968 |
| [45] | Patented | Jan. 19, 1971 |
| [73] | Assignee | Eastman Kodak Company<br>Rochester, N.Y.<br>a corporation of New Jersey |

[54] ADJUSTABLE MOUNTING DEVICE
1 Claim, 6 Drawing Figs.

[52] U.S. Cl. ................................................. 83/699,
83/6, 269/71
[51] Int. Cl. ................................................. B26d 1/00
[50] Field of Search .......................................... 83/6, 699;
77/31; 33/18; 269/51, 16, 71, 72, 73, 56, 57;
144/93

[56] References Cited
UNITED STATES PATENTS

| 721,797 | 3/1903 | Gustafsen ..................... | 77/31X |
| 1,748,556 | 2/1930 | McKnight ..................... | 77/31X |
| 2,947,214 | 8/1960 | Schwuttke et al. ........... | 269/73X |
| 2,948,168 | 8/1960 | McCormick .................. | 144/93X |
| 3,030,135 | 4/1962 | Polanski ....................... | 269/73X |
| 3,273,879 | 9/1966 | Floren .......................... | 269/73X |
| 3,308,704 | 3/1967 | Burkhardt .................... | 83/699 |

*Primary Examiner*—Frank T. Yost
*Attorneys*—Walter O. Hodsdon, P. R. Holmes and W. E. Jackson

ABSTRACT: An adjustable mounting device for a cutting tool is described. The device is comprised of elements which are angularly adjustable about orthogonal axes which intersect at a common point. The tip of the cutting tool is mounted in the device to substantially coincide with the common point of intersection so that the position of the tip remains substantially stationary when angular adjustments are made.

PATENTED JAN 19 1971 3,555,954

BURTON L. PAYNE
WARD K. DARRON
PETER M. ZURIS
INVENTORS

Paul P. Holmes
BY
W. E. Jackson
ATTORNEY & AGENT

ADJUSTABLE MOUNTING DEVICE

The present invention relates to an adjustable mounting device for an object, and, more particularly, to a device for adjustably mounting a cutting tool in a glass cutting apparatus.

It is well known to mount cutting tools to allow for various angular adjustments of the tool's cutting tip in relationship to a surface being scored or cut. For example, a ball and socket may be incorporated in a mounting device so that the cutting point can be placed in any desired angular orientation in planes parallel or perpendicular to the direction of cut. In the case of glass cutting it is often desired to adjust the cutting tip to an optimum angular position relative to the glass, especially when the tip's configuration is modified by wear. While the mounting devices of the prior art are generally acceptable, they do not maintain the cutting tip in a stationary position while the angular adjustments are made in planes perpendicular and parallel to the direction of cut.

Accordingly, an object of the invention is to provide a mounting device which, during angular adjustment, does not create substantial change of the location of the cutting tip of a cutting tool or surface point of another mounted object.

Another object of the invention is to provide a device for mounting a cutting tool for angular adjustment about three orthogonal axes—angular position about the central axis of the cutting tool, angular position in a plane parallel to the direction of cut, and angular position in a plane perpendicular to the direction of cut.

Still another object is to provide a mounting device where the angular adjustments can be made independently of the others.

Other objects and advantages of the present invention will be apparent to those skilled in the art by the description of a preferred embodiment of the invention which follows.

The above objects are accomplished by mounting an object so that it is angularly adjustable about different axes which intersect at a common point. A point on the surface of the mounted object, such as the tip of a cutting tool, also coincides with the common point of intersection so that the surface point remains substantially stationary when any angular adjustments are accomplished.

Reference is now made to the accompanying drawing wherein like reference numerals an characters designate like parts and wherein.

Figure 1:
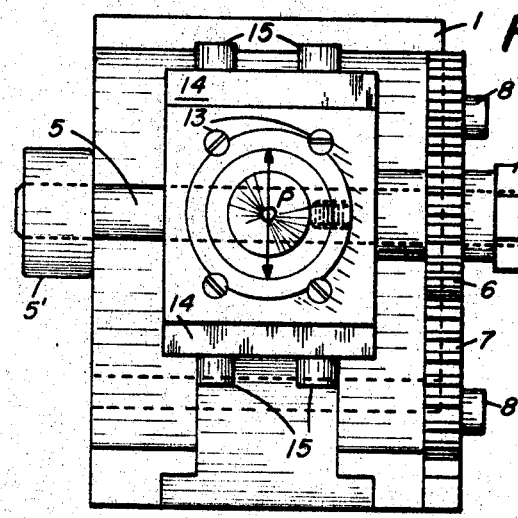
FIG. 1 is a plan view of an adjustable mounting device for a glass cutting tool with arrows showing the direction of cut.
Figure 4:
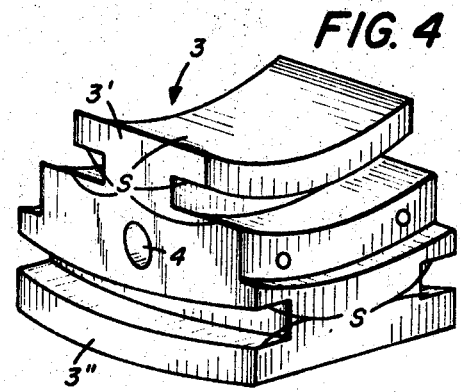
FIG. 4 is a view of the slide block showing the various cylindrical slide surfaces.
Figure 2:
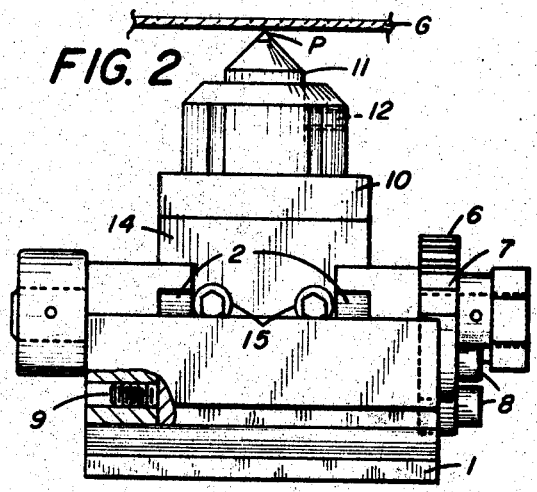
FIG. 2 is a side view, with portions broken away, of the device shown in FIG. 1.
Figure 3:
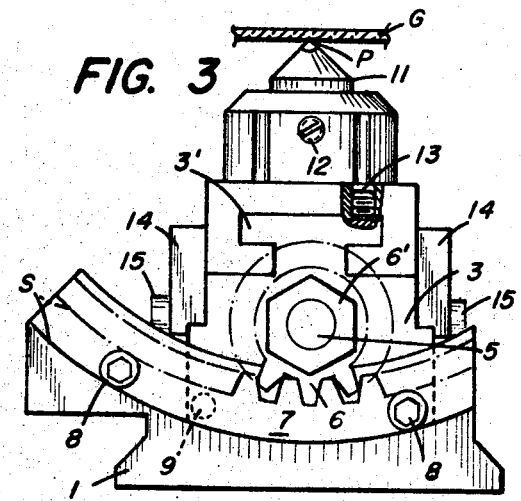
FIG. 3 is an end view, with portions broken away, of the device shown in FIGS. 1 and 2.
Figure 2A:
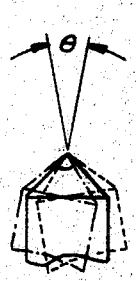
FIG. 2A is a broken view of FIG. 2 showing the angular limits of adjustment for the cutting tool.
Figure 3A:
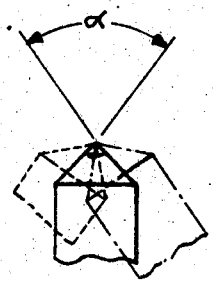
FIG. 3A is a broken view of FIG. 3 showing the angular limits of adjustment of the cutting tool.

With particular reference to the drawing, a grooved base 1 is shown. Base 1 is adapted for mounting in a scoring apparatus for glass cutting (not shown). A curved groove 2, in the form of an inverted T, is formed on the upper portion of the base 1. Slidably mounted in the groove 2 is the slide block 3. Slide block 3, as is best seen in FIG. 4, comprises the bottom half 3' of the slide arrangement for the angular adjustment $\Theta$ in a plane perpendicular to the direction of cut, the top half 3'' of the slide arrangement for the angular adjustment $\alpha$ in a plane parallel to the direction of cut, and a hole 4 for receiving the shaft 5. The slide arrangements include cylindrical slide surfaces S which have orthogonal axes of generation intersecting at a common point substantially coincident with tip P which is described below. Pinion gear 6 is rotatably mounted with shaft 5 and meshes with a curved rack 7 formed from an internal gear segment mounted solidly to base 1 by screws 8. Shaft 5 can have a collar or enlarged end 5' to maintain alignment of the pinion 6 with the rack 7. This arrangement allows the user to make a fine adjustment in the angular position $\alpha$ of the slide block 3 of course adjustment of the hexagonal head 6' integral with pinion 6. The desired angular adjustment is locked by means of a setscrew 9.

Mounted on the slide block 3 is a holder block 10. Holder block 10 includes a ferrule for holding a cutting tool 11 and forms the top half of the slide arrangement which permits the adjustment $\Theta$ in a plane perpendicular to the direction of cut of the cutting tool 11. Cutting tool 11, with a diamond tip P, is locked in the holder block 10 by means of setscrew 12. Setscrews 13 lock the holder block 10 in place on the base slide 3 by engaging its upper surface. Retainer plates 14, secured to slide block 3 by screws 15, aid in the alignment of the holder block 10 on the slide block 3. The various elements of the adjustable mounting device can be fabricated from suitable materials such as metal or plastic.

When it is desired to adjust the diamond tip P to an optimum angular relationship with a glass plate G, the tip P remains substantially stationary and the various elements of the mounting device are moved to the desired angular setting about orthogonal axes which pass through tip P. For example, if it is desired to adjust the diamond tip P about the longitudinal axis of the cutting tool, then setscrew 12 is loosened and the adjustment is made by rotating the tool. To adjust the diamond tip P for an 0 angle $\alpha$ in a plane parallel to the direction of cut, setscrew 9 is loosened and the adjustment is made by turning pinion gear 6 which causes slide block 3 to move. If it is desired to adjust the diamond tip P for an angle $\Theta$ in a plane perpendicular to the direction of cut, then setscrews 13 are loosened and the adjustment is made by moving the holding block 10. While the axes of a preferred embodiment are orthogonal, it should be understood that the desired adjustments could be made about axes intersecting at different angles.

From the above, it should be appreciated that all three adjustments can be accomplished independently of one another. This independence results from the fact that the tip P coincides with the axes of angular movement for the cutting tool 11, the holder block 10, and the slide block 3. Independent adjustment enables an operator to quickly and precisely adjust the mounting device.

It should also be appreciated that the adjustable mounting device of the present invention can be utilized in other fields of technology. For example, if used as a microscope stage, the mounting device would allow the examination of several sides of an object without removing it from the field of view. When used in this manner, a point located on the outer surface of the object would substantially coincide with the common point of intersection of the axes about which adjustment of the object is accomplished. The surface point could be at a surface discontinuity, such as the apex of a cone, or could be a location on a continuous surface. The mounting device could also be utilized to set and hold a metal working tool at a compound angle for grinding. Other uses of the adjustable mounting device of the present invention will be apparent to those skilled in the art.

The invention has been described in detail with particular reference to preferred embodiments thereof, but it will be understood that variations and modifications can be effected within the spirit and scope of the invention as described hereinabove and as defined in the appended claims.

We claim:

1. An apparatus for supporting an object in a desired position which comprises:
    a base having an arcuate longitudinally extending inverted tee-shaped groove, said arcuate inverted groove having a first axis of generation passing through a point on said object;
    an arcuate gear rack connected to said base and positioned adjacent to and parallel with said inverted groove, said arcuate gear rack having an axis of generation coincident with said axis of said inverted groove;
    a slide block slidably connected to said base;

an arcuate inverted tee-shaped portion on said slide block positioned in said inverted groove for guiding said slide block for movement along said base in an arc about said first axis to a desired position about said first axis of generation, said arcuate inverted portion having an axis of generation coincident with said first axis;

a pinion gear rotatably mounted on said slide block and in meshing engagement with said rack for moving said block along said inverted groove in an arc about said first axis;

an arcuate upright tee-shaped portion on said slide block, said arcuate upright portion having a second axis of generation perpendicular to said first axis and passing through said point on said object;

a holder block having an arcuate upright tee-shaped groove matable with said upright tee-shaped portion for slidably guiding said holder block for movement along said slide block in an arc about said second axis to a desired position about said second axis of generation, said arcuate upright groove having an axis of generation coincident with said second axis;

a ferrule secured to said holder block for supporting said object and providing for rotation of said object into a desired position about a third axis passing through said point on said object and said third axis being perpendicular to said first and second axes; and means for locking said object in a desired position.